United States Patent Office 3,342,947

Patented Sept. 19, 1967

3,342,947
HUNTING AND SELECTING IDLE CONNECTION PATHS IN COUPLING FIELDS OF COMMUNICATION SYSTEMS

Helmuth Joachim Bock, Munich, Germany, assignor to Siemens & Halske Aktiengesellschaft, Berlin and Munich, Germany, a corporation of Germany Filed Jan. 30, 1964, Ser. No. 341,325
Claims priority, application Germany, Feb. 4, 1963, S 83,586
16 Claims. (Cl. 179—22)

The invention disclosed herein is concerned with a circuit arrangement for hunting for and selecting idle connection paths in a field of coupling points, sometimes also referred to as cross wire field, which may have as many coupling stages as may be desired and practicable, and in which one of a plurality of connection paths may be selected in the event that more than one idle connection paths are found to be available. The coupling points in such a field of coupling points, briefly referred to herein as coupling field or linking fiield, are in the individual stages arranged in crossing fashion. Coupling points which are in rows and columns connected in multiple, form a coupling multiple which is achieved by the use of a coordinate switches. Such a coordinate switch may be a crossbar switch or a cross-coil switch or a relay coupler. At each coupling point is provided a coupling element, referred to as coupling point contact, which assumes its operating position upon extension of a connection over such coupling point. A plurality of such coupling point contacts may be involved in the extension of a connection.

The individual coupling stages of the coupling field, which may contain a plurality of coupling multiples, are in definite manner connected with one another, over intermediate lines or trunk lines which comprise respectively a plurality of conductors, for example, line conductors and a seizure or private conductor. The arrangement of these trunk lines is determined by the grouping plan or scheme which is based upon considerations having to do with theoretical aspects of the traffic conditions involved in any given case. The trunk lines are primarily so arranged that at least one trunk line extends from one respective coupling multiple of one coupling stage to each coupling multiple of the neighboring coupling stage.

Systems and circuit arrangements are already known for the hunting and selection of idle connection paths in a coupling field in accordance with the above indicated procedure. In such circuit arrangements, there is a so-called pathfinder network superposed on the coupling field, having conductors which are assigned to the trunk lines, such conductors being directly interconnected at the places of the coupling field at which are disposed the coupling multiples. These connecting points are hereinafter referred to as marking junctures. To such pathfinder network are to be connected various markings which must not interfere with one another despite the fact that each trunk line has in such pathfinder network only one pathfinder conductor.

For the hunting and selection of idle connection paths, there are selected, at intersecting points extending transversely through the pathfinder network, suitable and already marked path portions which are thereupon marked again. As already noted, these different markings must not mutually interfere, despite the fact that each trunk line has in the pathfinder network only one pathfinder conductor. This is achieved by effecting the renewed marking of the respective path portion, after the selection thereof at an intersecting point, by a restriction or limitation of the marking that was present previously at the respective intersecting point, so that there is marked only the selected path portion.

Several embodiments have become known relating to the above indicated system. In one embodiment, there are provided in the coupling field, at both sides of a first intersecting point, further intersecting points at which selection operations can be simultaneously effected. Relays or flip-flop circuits and ring cores as well as further means are provided for the limitation or restriction of the markings. The selection is effected respectively among the coupling multiples. In a further embodiment, the selection is effected among trunk lines. An example has also been given in which further intersection points lie merely at one side of the first intersection point.

The invention proposes a new approach for effecting the renewed marking of a selected path portion by a limitation, alteration or restriction of the previously present marking. The selection is advantageously effected respectively among coupling multiples. Further intersecting points may thereby be placed on both sides of the first intersecting point, whereby a plurality of selection operations can be effected simultaneously so as to save time. Switching means operating relatively slowly, for example, relays, are to be avoided. Flip-flop circuits and ring cores are likewise unnecessary. There are instead only a few gate circuits required at the marking junctures, which can operate at high speed, thus providing an advantageous and efficient system.

The new system is accordingly concerned with the hunting and selection of idle connection paths in a coupling field having as many coupling stages as desired and practicable, comprising a pathfinder network including conductors which are assigned to trunk lines, such conductors being interconnected at marking junctures assigned to coupling multiples, wherein the input and output belonging to a desired connection are simultaneously marked, whereupon a path porton which is marked from the input and output, is at an intersecting point extending transverse through the pathfinder network, selected and thereupon newly marked by altering the marking previously present at such intersecting point, such new marking being oppositely to the original markings in the pathfinder network; transmitted to further intersecting points at which a respective further suitable path portion is selected with the aid of the markings merging thereat, and wherein these operations are repeated until a path is determined in the pathfinder network, by the selected path portions, over which a connection is to be extended.

The characteristic feature of the arrangement according to the invention resides in that the extension of the original markings to the first intersection point is interrupted at the intersection points adjacent to or neighboring on the respective sides of the first intersection point, upon selection of a path portion at the first intersection point for the alteration or restriction of the marking, so that the marking which is applied to the path portion selected at the first intersection point, is extended to two neighboring intersection points over conductors of the pathfinder network, which conductors are provided for the original markings, without being influenced by the original markings, whereupon further path portions are selected at these intersection points according to the existing markings, the original markings being likewise interrupted, for the further restriction of the markings, at the further neighboring intersection points lying beyond these intersection points, so that markings applied subsequently to the path portions selected at the intersection points neighboring directly on the first intersection point, can also be transmitted uninfluenced to these further intersection points, whereupon path portions are selected at the further intersection points, sufficient repetition of these operations resulting in the determination of the path hunted for and extending over the coupling field.

The various objects and features of the invention will appear from the appended claims and from the description thereof which is rendered below with reference to the accompanying drawings.

Figures 3, 4, 5, 10:
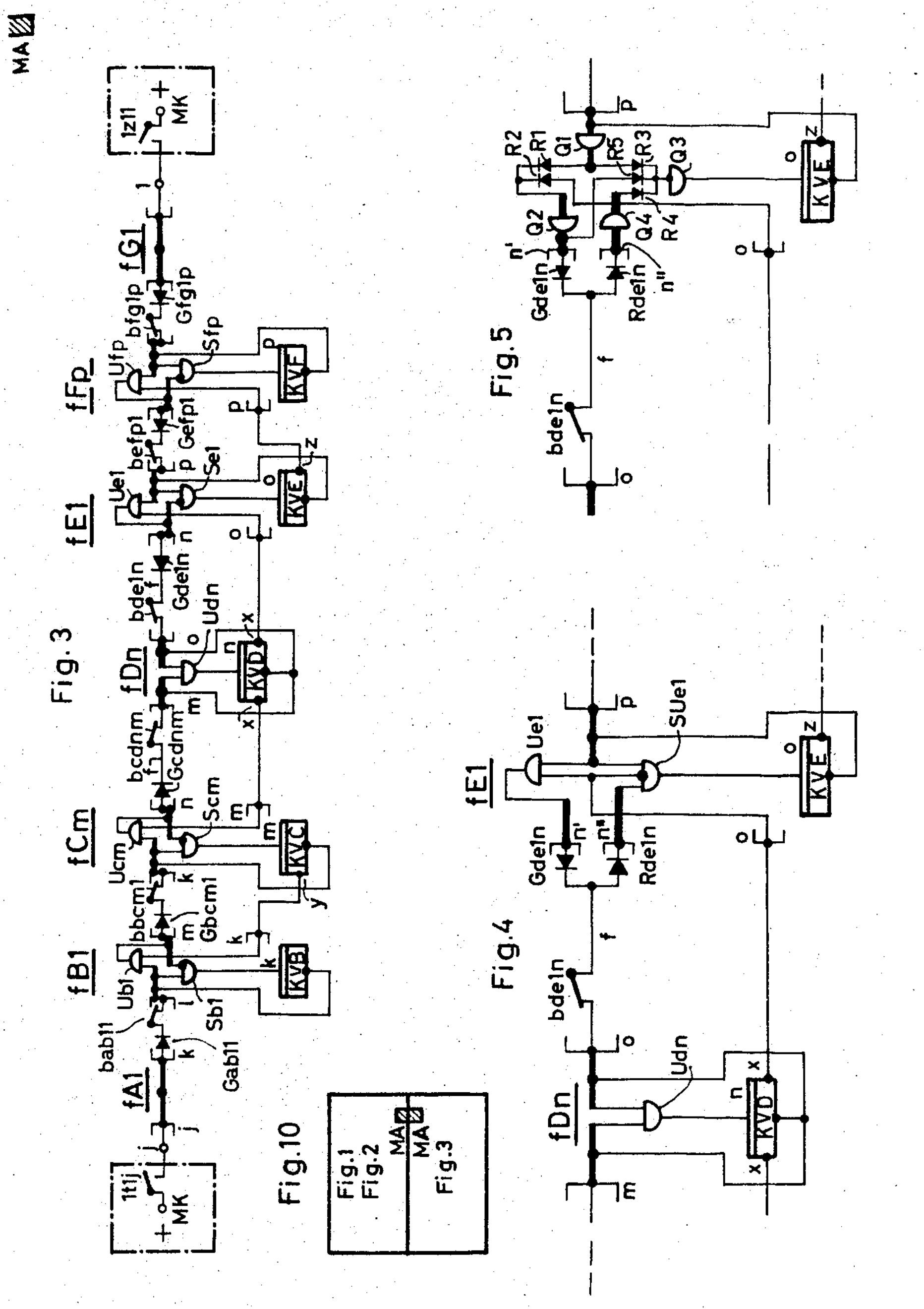
Figure 6:
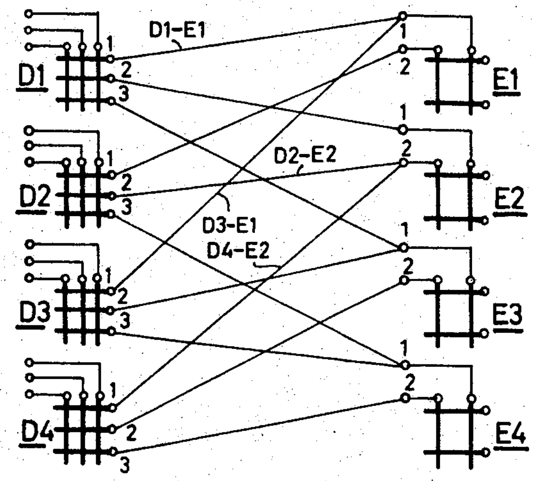
Figures 7, 8:
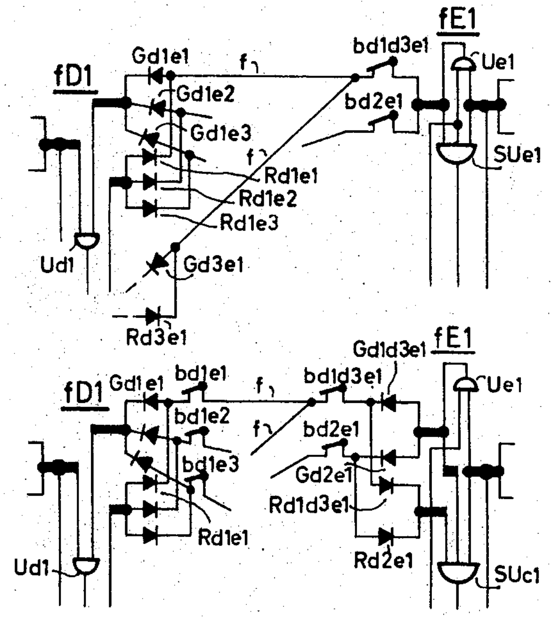
Figure 9:
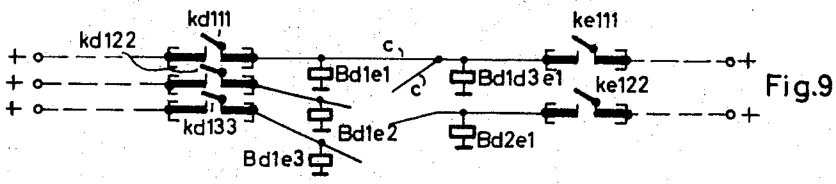

FIGS. 3, 4 and 5 indicate examples of circuit arrangements employed for carrying out the invention;

FIG. 6 illustrates an example of a part of a coupling field with branching trunk lines;

FIGS. 7 and 8 show the manner in which decoupling diodes and seizure or busying contacts are to be inserted in the circuit according to FIG. 6;

FIG. 9 indicates the manner in which the seizure or private relays are to be arranged; and FIG. 10 shows how the drawings should be assembled for the reading thereof, namely, with the index mark MA below and at the right end of FIG. 2 in alignment with the similarly referenced index mark MA at the right and slightly above FIG. 3, so that the respective coupling stages will appear in the various figures in the proper vertical alignment.

In order to facilitate the understanding of the invention, there will first be described the structure of the coupling field shown in FIG. 1 and the arrangement of the line or voice current conductors indicated in FIG. 2.

Figure 1:
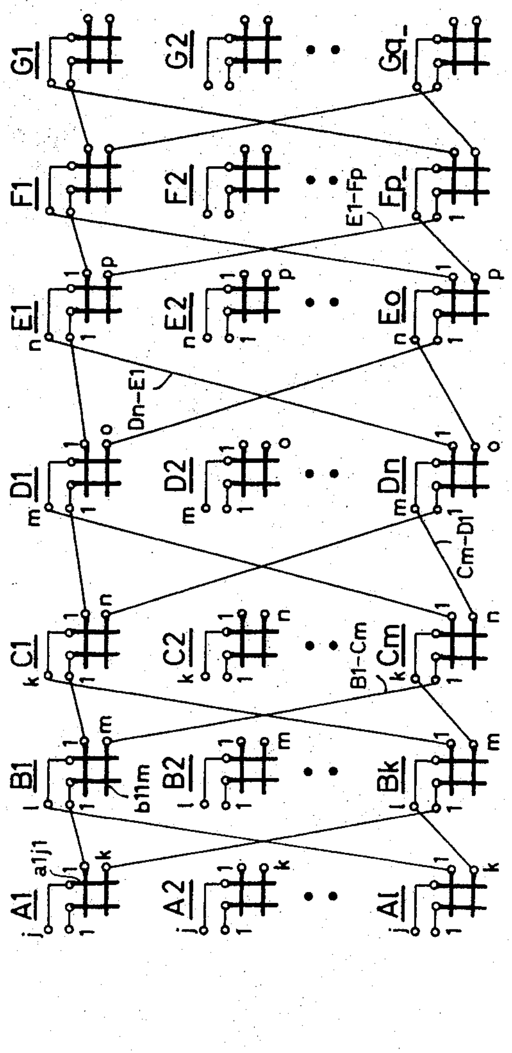
FIG. 1 shows by way of example a simple grouping plan or scheme for a seven-stage coupling field.

The coupling or linking field shown in FIG. 1 comprises seven coupling or linking stages A to G. Each coupling stage contains a plurality of coupling multiples, each coupling multiple being achieved by the use of coordinate switches. For example, the coupling stage *a* contains coupling multiples A1 to A*l*; the coupling stage B contains the coupling multiples B1 to B*k*, etc. The coupling multiples are in each stage of similar construction. The inputs of the coupling field are located at the coupling stage A and constitute at the same time the inputs for the coupling multiples of such coupling stage. Each coupling multiple of the stage A has *j* inputs and *k* outputs. Accordingly, the stage B has *k* coupling multiples each with an input *l*. Each coupling multiple of the stage B can thus be reached from each input of the stage A. The arrangement of the coupling field continues in this manner over the further stages. The outputs of the coupling multiples of the stage G also constitute the outputs of the coupling field. The coupling multiples are only schematically indicated and the trunk lines are only partially shown. At the crossing points of the rows or lines (horizontally) and at the columns (vertically) of the coupling multiples, that is, at the coupling points, there are disposed contacts which are respectively assigned to the corresponding coupling points and therefore referred to as coupling point contacts. For example, there is in the coupling multiple A, at the crossing point between the *j*-column and the first row, the coupling point *a*1*j*1 (FIG. 1) to which is assigned, among others, the coupling point contact 1*ka*1*j*1 (FIG. 2). To the coupling point *b*11*m* of the coupling multiple B1 is similarly assigned, among others, the coupling point contact 1*kb*11*m*. Such coupling point contacts are also inserted in the network of line conductors and in further conductors of other not illustrated networks. The grouping plan illustrated in FIG. 1 represents the scheme according to which the coupling multiples and the marking junctures which are respectively assigned thereto, are in the various networks mutually interconnected over conductors of intermediate lines referred to as trunk lines. The line conductors or voice current conductors *a* and *b* of the coupling field are extended over coupling point contacts which are disposed at the crossing points in the respective coupling multiples.

Figure 2:
FIG. 2 represents the course of the line or voice current conductors *a* and *b* for a connection path extending between an input and an output of such coupling field.

FIG. 2 represents the course of the line conductors (voice current conductors) *a* and *b* of one of the many possible connection paths that may be established in the network, such connection path being established as a result of the path finding operations by the closure of the respective coupling point contacts provided therefor. These coupling point contacts are shown in FIG. 2 in normal position, that is, in open position thereof. The illustrated connection path extends, for example, from the coupling field input T1*j* to the coupling field output Z11. The coupling field input T1j lies at the *j*-input of the coupling multiple A1 of the stage A and the coupling field output Z11 lies at the first output of the coupling multiple G1 of the stage G. The connection path extends in this example from the coupling field input T1*j* over the coupling point contact 1*ka*1*j*1 to the output *l* of the coupling multiple A1. This coupling point contact therefore lies at the crossing point *j* and the row or line *l* of the coupling multiple A1. The multiple circuit symbols shown at the left and right of the coupling point contact 1*ka*1*j*1 (FIG. 2) indicate that a plurality of coupling point contacts are simultaneously closed in the respective columns and rows of the involved coupling multiple. The left hand multiple symbol refers to *k* coupling point contacts which are respectively connected to a column and the right hand multiple symbol refers to *j* coupling point contacts respectively connected to a row. A trunk line (intermediate line) extends from the coupling point contact 1*ka*1*j*1 to the input *l* of the coupling multiple B1 of the stage B, the coupling point contact 1*kb*11*m* being assigned to the connection path. Multiple symbols are also indicated in connection with this latter coupling point contact. From the output *m* of the coupling multiple B1 extends a trunk line to the first input of the coupling multiple C*m* of the stage C. The connection path extends further over the coupling point contact 1*kcm*1*n*, over the coupling point contacts 1*kdnm*1, 1*ke*1*np*, 1*kfp*11 and 1*kg*1*p*1 of the output Z11.

FIGS. 3 to 5 show various circuit arrangements which operate according to the pathfinder system disclosed herein.

The circuit arrangement shown in FIG. 3 shall be considered first. The conductors shown in this figure are part of the pathfinder network. Only part of this network is shown in FIG. 3 in a manner similar to the showing of the network of line conductors represented in FIG. 2. The network of the pathfinder conductors is superposed on the coupling field and is arranged in accordance with the grouping plan represented in FIG. 1. It has, however, some peculiarities which are illustrated in FIG. 3. The coupling multiples are substituted by so-called marking junctures, consisting respectively of a connection point, at which are connected the respective pathfinder conductors which are assigned to the trunk lines which terminate in the corresponding coupling multiple. The pathfinder conductors *f* represented in FIG. 3 extend by way of the marking junctures *f*A1, *f*B1, *f*C*m*, *f*D*n*, *f*E1, *f*F*p* and *f*G1.

Moreover, seizure or busying contacts are inserted in the pathfinder conductors. Such contacts are closed in the respective pathfinder conductors which extend to idle trunk lines while being open in the case of pathfinder conductors which extend to busy trunk lines. In the pathfinder conductor which is associated with the trunk line extending from the coupling point contact 1*ka*1*j*1 of the coupling A1 (FIGS. 1 and 2) to the coupling point contact 1*kb*11*m* of the coupling multiple B1, there is inserted the seizure or busying contact *bab*11 (FIG. 3).

As shown in FIG. 3, further seizure contacts *bbcm*1, *bcdnm*, *bde*1*n*, *befp*1 and *bfg*1*p* are inserted in similar manner in the other pathfinder conductors. Decoupling diodes G*ab*11, G*bcm*1, G*cdnm*, G*de*1*n*, G*efp*1 and G*fg*1*p* are also inserted in the pathfinder conductors. The decoupling diodes are polarized so that markings are transmitted from inputs or outputs of the coupling field always to the first intersecting point, but not in reverse direction. These markings are effected with a positive marking potential. Contacts 1*t*1*j* and 1*z*11 (left and right end of FIG. 3, respectively) are, for example, closed for this purpose. The first intersecting point lies at the coupling stage D. The pathfinder conductors shown in FIG. 3 constitute only part of such conductors in the entire network. There are in the entire network exactly as many marking junctures as there are coupling multiples in the coupling field according to FIG. 1, the trunk lines extending between the respective marking junctures. The marking potential is from the marking juncture *f*A1 extended over all idle trunk line conductors to a plurality of marking junctures in the coupling stage B. The decoupling diodes in the pathfinder conductors prevent undesired transmission of the marking potential from the marking juncture of the coupling stage B rearwardly, to other inputs of the coupling field, which would result in undesired by-passing of occupied pathfinder conductors which are interrupted by open seizure contacts. The effect of the decoupling diodes is similar in the case of the other pathfinder conductors.

It may be noted at this point that the above described marking junctures are in place of coupling multiples also provided in connection with the parts of pathfinder networks belonging to different embodiments, as shown respectively in FIGS. 4, 5 and 7, 8.

Further intersection points are in all these pathfinder networks provided on each side of the first intersection point. The intersection points are placed so that they intersect coupling multiples or marking junctures, respectively. Coupling multiples are respectively used as path portions. At the first intersection point is effected the selection among the coupling multiples of the coupling stage D, the selection being carried out with the aid of the centrally positioned coupling multiple selector switch KVD. The coupling multiple selector switch KVE is associated with another intersecting point. The remaining coupling multiple selector switches shown in FIG. 3 are likewise associated with further intersection points.

In each of the respective pathfinder networks there is provided a coincidence circuit in the marking juncture at the first intersecting point, over which the marking condition of such marking juncture is signalled to the central coupling multiple selector switch KVD. Thus, in the marking juncture *f*D*n* (first intersection) is inserted the coincidence circuit U*dn*. Upon extension of the positive marking potential, connected to an input and an output of the coupling field, to both inputs of a respective coincidence circuit, there will be delivered at the output of the corresponding coincidence circuit a signal for the coupling multiple selector switch KVD, which signal signifies that the respective marking juncture (coupling multiple) is suitable as a path portion for the sought for connection path. The coupling multiple selector switch KVD thereupon selects one coupling multiple from the coupling multiples which have thus been indicated as available. The respectively associated marking juncture is marked with the aid of a marking potential. This marking potential is delivered at the conclusion of the selection operation, from the output of the coupling multiple selector switch KVD which is cooperatively associated with the selected marking juncture. The corresponding output is therefore connected with the involved marking juncture.

Negative marking potential is for this purpose used in the circuit arrangement shown in FIG. 3. This negative marking potential is upon selection of the coupling multiple D*n* extended to the pathfinder conductors connected with the marking juncture *f*D*n* and from there to the marking junctures of the neighboring intersection points. Particular measures are taken at the marking junctures of these intersection points so as to enable the alteration (narrowing or restriction) of the marking at the first intersection point to the selected path portion and to enable the evaluation of the markings which thereafter remain. These measures include the insertion of a first and a second gate circuit at these marking junctures. For example, at the marking juncture *f*E1 is provided the gate circuit U*e*1 over which is transmitted the original marking potential, that is, the marking potential which originated at an output of the coupling field. The ability of these gate circuits to effect transmission ceases in the course of the restriction of markings. In the example of the circuit arrangement shown in FIG. 3, this is effected as follows:

A coincidence circuit is always utilized as a first gate circuit. One input of such a coincidence circuit is connected to pathfinder conductors incoming from the output side of the coupling field. The other input is respectively connected to the output *x* of the coupling multiple selector KVD, from which a positive potential is delivered up to the conclusion of the selection operation. Accordingly, the marking potential incoming in a given case from the output side of the coupling field, is up to this instant transmitted over the coincidence circuit U*e*1 as well as over the remaining corresponding coincidence circuits. The marking potential is extended from the output to the pathfinder conductors which lead to the coupling stage D, and thence to the marking junctures by way of idle trunk lines.

Upon cessation of the transmission of the first gate circuits, the second marking potential, having negative polarity, which had been connected to the marking juncture *f*D*n*, selected at the first intersection point, reaches over idle trunk lines the marking junctures of the two adjacent coupling stages. The decoupling diodes which are inserted in the pathfinder conductors extending to the respective coupling stages, do not block this potential, but they prevent extension thereof to non-selected marking junctures of the coupling stage D, which would result in erroneous markings. In connection with the previously mentioned marking juncture *f*E1, there is provided, as in connection with the marking junctures of the remaining further intersection points, a second gate circuit for the evaluation of the first and second marking potentials extended thereto. One input of the corresponding gate circuit S*e*1 is connected with the pathfinder conductors extending from the output side of the coupling field, while the second input is connected with the pathfinder conductors incoming from the coupling stage D at which is located the first intersection point. The coupling multiple selector KVE receives from the gate circuit S*e*1 in given cases a signal which signifies the simultaneous appearance of both marking potentials. The output of this gate circuit is for this purpose connected with the coupling multiple selector KVE. The outputs of the second gate circuits (not shown) of the other marking junctures of this coupling stage E, are likewise connected to this coupling stage E. The coupling multiple selector KVE effects a selection among the coupling multiples and marking junctures, for which the simultaneous appearance of both marking potentials had been signalled, thus determining a further path portion for the connection path which is being hunted or sought for.

The respective second gate circuit used in the circuit example shown in FIG. 3, is a blocking circuit which delivers a signal at its output only when the first marking potential, that is, positive marking potential, is extended to one of its inputs while the second marking potential, that is, negative potential is extended to its other inputs. This other input is in FIG. 3 in connection with each respective second gate emphasized by a pronounced dot.

The coupling multiple selector KVE is likewise provided with outputs which are respectively assigned to the coupling multiples and marking junctures of its coupling stage E. The corresponding outputs deliver the second marking potential which serves for the marking of the selected path portion. Accordingly, upon selection of the coupling multiple E1 and associated marking juncture *f*E1, there is connected negative marking potential to the latter, by way of the output of the coupling multiple selector KVE which output is connected therewith. There is now concluded the delivery of the corresponding potential, which was until this instant supplied from the output *z* of the coupling multiple selector KVE, to the coincidence circuits, at the marking junctures *f*E1 . . . *f*F*p* of the adjacent coupling stage F. The cessation of delivery of its marking potential cancels at the corresponding coupling stage the transmissibility of the coincidence circuits provided at such stage. Accordingly, the marking previously present at the coupling stage E, is restricted to the selected portion of the sought for connection path.

The selection of a portion of the connection path is in similar manner effected at the coupling stage F with the aid of the coupling multiple selector KVF which selects the coupling multiple F*p*, thus determining a connection path extending from the coupling multiple D*n* to the output Z11. A selection in the coupling stage G is unnecessary since there is only one path extending from the selected coupling multiple F*p* to the output Z11, such path extending by way of the coupling multiple G1 to which is connected the output Z11.

The selection of the coupling multiple D*n* by the coupling multiple selector KVD also cancels the transmissibility of the coincidence circuits serving as first gate circuits at the coupling stage C. Accordingly, the selection of a path portion and restriction of the marking can likewise be effected at the coupling stage C, with the aid of the coupling stage selector KVC, in a manner analogous to the selection effected before in connection with other intersection points adjacent to the first intersection point. Thus, there may be selected the coupling multiple C*m*. Thereupon is effected, in entirely analogous manner, the selection of a path portion at the coupling stage B, wherein the coupling multiple B1 may be selected. A connection path is thus determined leading from the coupling multiple D*n* to the input T1*j* (FIG. 2), thereby terminating the pathfinding operations. It is understood, of course, that the selection operations at the two sides of the first intersection point may be effected simultaneously.

However, a portion of the connection path must first be selected at the first intersection point, as already described, based upon the original markings connected respectively to an input and an output of the coupling field. These markings are extended to suitable marking junctures of the first intersection, which in the assumed example lies at the coupling stage D. The corresponding markings are signalled to the coupling multiple selector KVD which thereupon selects a coupling multiple, marks the respectively associated marking juncture, and interrupts the transmission of marking potential at the adjacent coupling stages, in the assumed case, the coupling stages C and E. Suitable coupling multiples are thereupon signalled to coupling multiple selectors KVC and KVE of these intersection points, the associated marking juncture is marked and the transmission of the marking potential is interrupted at the adjacent intersection points lying in directions toward the outsides of the coupling field, whereupon the selection operations are effected at the corresponding intersection points. All path portions required for the sought for connection path are in this manner ascertained. To the outputs of the respective coupling multiple selectors are connected switching means (not shown) for the setting, that is, for the switching-through of the ascertained connection path, detailed examples as to the manner in which the setting of the ascertained connection path is to be effected after the selection of the respective path portions, being given in the copending application Ser. No. 762,656, filed Sept. 22, 1958, now Patent No. 3,175,043, which is owned by the assignee named in the present case. The arrangement described in the copending application provides switching means for the setting of given connection paths, which switching means are disposed in a network of setting conductors which is superposed on the coupling field, serving for the actuation of coupling point contacts. For the holding of actuated coupling point contacts, there are in the case of cross-coil selectors, special holding coils provided which are connected to the network of the seizure or private conductors.

The marking of the respective input and output can be cancelled upon conclusion of the selection operations, by opening the contacts 1*t*1*j* and 1*z*11 (FIG. 3). The coupling multiple selectors are restored to normal condition. In the normal condition, the coupling multiple selectors KVD, KVC and KVE again deliver positive marking potential at the respective outputs *x*, *y* and *z*. The actuation of the contacts 1*t*1*j* and 1*z*11 as well as the restoration of the coupling multiple selectors is effected by a central control device which is referred to as a marker. Such a marker can also be used in connection with all of the circuit examples to be presently described. The operation of such markers is well known and details with respect thereto are therefore omitted. The marker which is to be used also operates for successively processing the extension of connections, by temporarily placing marking potential on the respectively involved inputs and outputs. The coupling point contacts which are respectively assigned to ascertained connection paths are thereupon actuated, thereby effecting the setting (switching-through) of the corresponding connection paths. As previously noted, the coupling multiples may be of different construction, for example, in the form of crossbar switches, cross-coil switches, or relay couplers.

The marking of several outputs at the coupling multiple G1, instead of the marking of only the output Z11, would have no effect on the above described pathfinder operations. Upon conclusion of this path finding, it would merely remain to select one among the various marked outputs. In the event that all of the various marked outputs do not belong to the same coupling multiple, but that they are distributed among several coupling multiples of the coupling stage G, it will be necessary in the course of the path finding, to select also a coupling multiple of this stage. Accordingly, a coupling multiple selector must also be provided in connection with this stage. Since a coupling multiple was selected in such stage, a definite marked output can be selected from among the marked outputs of the corresponding coupling multiple. A plurality of inputs can likewise be considered in the path finding, in the same manner as a plurality of outputs of the coupling field.

In such case, there are to be provided selection devices in connection with the coupling stage, which are required for this purpose. It is also possible to consider simultaneously a plurality of outputs as well as a plurality of inputs, without encountering any difficulties in the path finding operations. Details may be had in this respect from U.S. Patent No. 3,038,968, dated June 12, 1962.

In the search and selection above explained of an idle connection path with the aid of the path finding network illustrated in FIG. 3, the various operations cooperate in the following manner. First of all, by means of the marking potential, the input to be utilized of the coupling field is established by closure of the contact 1*t*1*j* and the contact 1*z*11 is closed for the establishment of the output. Over both contacts a positive potential is placed on the path finding network. This potential is conducted onward for path finder conduction belonging of the path seeking network of the intermediate lines, and over marking juncture to the marking juncture of the first intersecting point. Thus, for example, the positive potential is conducted over the now closed contact 1*z*11 to the marking juncture *f*G1, over the decoupling directional conductor G*fg*1*p*, over the seizure contact *bfg*1*p*, over the coincidence gate U*fp* belonging to marking juncture *f*F*p*, over the decoupling directional conductor G*efp*1, over the seizure contact *befp*1, over the coincidence gate U*e*1 belonging to the marking juncture FE1, over the decoupling directional conductor G*ge*1*n* and over the seizure contact *bde*1*n* to the coincidence gate U*dn*, which belongs to the marking juncture *f*D*n*, which is at the first intersection point. This potential, besides being propagated over the path indicated above, can also be propagated over other paths, whose presence is indicated by the multiple circuit symbols at the decoupling directional conductors G*fg*1*p*, G*efp*1 and G*de*1*n*. There, however, only paths are involved which are conducted over closed seizure contacts. These paths, too, lead over coincidence gates lying at the marking juncture concerned, which coincidence gates correspond to the coincidence gates U*fp* and U*e*1 already mentioned. These coincidence gates are connected with the outputs *x* and *z* of the coupling multiple selector switches KVD and KVE, from which a positive potential likewise is delivered, so that the coincidence gates mentioned are also actually in a position for the passing on of positive potential. The fact must be considered that the potential applied over the contact 1*z*11 passes not only to the marking juncture *f*D*n*, but also to other marking junctures (not represented in FIG. 3) lying on the first intersection point.

As already mentioned, positive potential is also placed on the path seeking network through contact 1*t*1*j*. This positive potential, passing over the marking juncture *f*A1, *f*B1, *f*C*m* as well as over the switching elements lying between, likewise passes to the coincidence gate U*dn* of the marking juncture *f*D*n*. As with respect to the positive potential applied through the contact 1*z*11, it is necessary to consider the fact that the potential applied through contact 1*t*1*j* likewise also passes to further marking juncture of the first intersecting point. All the coincidence gates belonging to the first intersecting point, such as, for example, the coincidence gate U*dn*, in which gates positive potential passes to both inputs in the above described manner, pass this positive potential onward over their respective outputs to the coupling multiple selector switch KVD.

At the first intersecting point there are provided altogether *n* coincidence gates, as is indicated by the reference symbol *n* appearing at the coupling multiple selector switch KVD. If through at least one of these coincidence gates the positive potential is passed on to the coupling multiple selector switch KVD, there is then carried out through this coupling multiple selector switch a selection process which results first of all in the switching off of the positive potential previously delivered over the output *x*. One output among those outputs which are allocated to the coincidence gates delivering positive potential is then selected, as negative potential is now determined from this output. Each output of the coupling multiple selector switch KVD is now connected in each case with that marking juncture to which the allocated coincidence gate belongs. Thus, the output concerned shown in FIG. 3 is allocated to coincidence gate UD*n* and is simultaneously connected with the marking juncture *f*D*n*.

For the further course of the operations it is assumed that through the selection process of coupling multiple selector switch KVD the output connected with marking juncture *f*D*n* now delivers negative potential. This negative potential is now conducted onward over the path seeking network in the direction toward the outputs and also in the direction toward the inputs of the coupling field. Thus, in the direction to the outputs it passes over the seizure contact *bde*1*n* and over the decoupling directional conductor G*de*1*n* to the one input of the blocking circuit S*e*1. On the other input of this blocking circuit there already lies positive potential applied over contact 1*z*11. At the input suppled with negative potential a negation is provided which is indicated by a dot appearing thereat. Consequently, the blocking circuit S*e*1 now delivers positive potential to the allocated input of the coupling multiple selector switch KVE. It should be further noted that previously, by switching off of the positive potential on output *x* of the coupling multiple selector switch KVD, the coincidence gate U*e*1 had terminated the passing on of positive potential. Over the multiple circuit designated by the symbol *o* at the marking juncture *f*D*n* the negative potential applied from the coupling multiple selector switch KVD at this marking juncture can also pass to other marking junctures which lie on the same intersecting point as the marking juncture *f*E1, if in the path finding conductions, not represented in FIG. 3, there lie seizure contacts which have just been closed. All blocking circuits lying at such marking junctures corresponding to the blocking circuit S*e*1, then deliver positive potential to the coupling multiple selector switch KVE. In a manner corresponding to that described, with respect to the coupling multiple selector switch KVD lying at the first intersecting point, the coupling multiple selector switch KVE lying on the intersecting point belonging to marking juncture *f*E1 carries out a selection process. Correspondingly, first of all the positive potential delivered thereto over the output *z* is switched off. Then from one of the other outputs coming involved positive potential is delivered. In this case this is the output connected with the marking juncture *f*E1. Through the switching off of the positive potential at output *z* of the coupling multiple selector switch KVE, the previous transfer of positive potential over the decoupling directional conductor G*efp*1 and the seizure contact *befp*1 is interrupted, since positive potential is no longer supplied to both inputs of the coincidence gate U*fp*. Instead, now over the seizure contact *befp*1 and the decoupling direction conductor G*efp*1, the negative potential applied from coupling multiple selector switch KVE to the marking node *f*E1 is transmitted in the direction toward the outputs of the coupling field. It passes there to the blocking circuit S*fp*. From this blocking circuit, in a similar manner as previously described, from the blocking circuit S*e*1 to the coupling multiple selector switch KVE, positive potential is now supplied to the coupling multiple selector switch KVF. It is necessary to consider the fact that positive potential also is supplied to other inputs of this coupling multiple selector switch, namely in a corresponding manner as previously was possible with respect to coupling multiple selector switch KVE. Likewise, in coupling multiple selector switch KVF, through supplying of positive potential, a selection process is triggered. This leads here to the applying of positive potential to the output allocated to marking juncture *f*F*p*. Thereby the appertaining coupling multiple is established for use in the connection path. In a corresponding manner, as previously described, the coupling multiples allocating to marking junctures *f*E1 and *f*D*n* had been established for utilization in the connection path. Thus, there is established the part of the whole connection path leading from the given output to the coupling multiple D*n* and the contact 1*z*11 can again be opened.

As will be noted, the path finder network illustrated in FIG. 3 in reference to the first intersecting point in which there lies, among others, the marking juncture *f*D*n*, is symmetrically built up. This also relates to the appertaining selection devices. The processes in the search and selection of further coupling multiples for the connection path between the given input and given output develop, therefore, on the left side of the first intersecting point exact as on the right side of such intersecting, for which the operations have been described above in detail. In the example presented, on the left side of the first intersecting point there are selected in this manner the coupling multiples C*m* and B1 allocated to the marking juncture *f*C*m* and *f*B1. Thereby the whole connection path is established which leads from the given input *j* of the coupling multiple A1 to the given output 1 of the coupling multiple G1. The switching through of this connection path and the restoration of the coupling multiple selectors belonging to the path finder network into their starting position has already been explained.

Intermediate lines or trunk lines instead of coupling multiples may likewise be selected in the path finding operations, merely requiring an appropriate arrangement of the intersecting points. The path finding can be otherwise effected as described.

In the grouping plan according to FIG. 1, the number of inputs of a coupling stage is equal to the number of outputs of the preceding coupling stage. To the respective terminals of the coupling multiples of these coupling stages is therefore connected only one trunk line (intermediate line). There may also be grouping plans for coupling fields in which these limitations as to the construction thereof are not present. However, in such coupling fields, the hunting and selection of connection paths can likewise be effected in accordance with the invention. There may be considered the case that two trunk lines, for example, extend between the selected coupling multiples of adjacent coupling stages. The one of these two trunk lines which is to be used, is not determined in a case in which the selection operations determine coupling multiples. In order to obtain its determination, it is therefore necessary to select in this case, for example, with the aid of an auxiliary selection device, one of the two trunk lines. Instead of proceeding in this manner, it is also possible to subdivide the coupling multiples into two parts so as to obtain coupling multiples which are respectively connected over only one trunk line. The path finding can then be carried out in the original manner.

The path finding according to the invention can therefore be applied in the case of coupling fields which are constructed as desired. The coupling field can also have as many coupling stages as desired and practicable, since the devices provided in the individual coupling stages are independent of the number of coupling stages. The first intersecting point may lie at any desired coupling stage. All this applies likewise in the case of the variants and constructions of the above described pathfinder system, which are described below.

A variant of the pathfinder system according to the invention will first be explained with reference to FIG. 4, showing the circuit means and associated coupling multiple selectors to be provided at a marking juncture of the first intersection point and at the marking juncture of an adjacent intersection point, respectively. At the marking juncture of the first intersection point are provided circuit and switching means corresponding to those used at such juncture in FIG. 3. The principal difference as compared with the pathfinder system according to FIG. 3 resides in that the same marking potential is used for the marking of the input and output as well as for the connection of markings to the path portions, instead of different marking potentials. In the circuit example here involved, the marking potential is always positive. The transmission or extension of the original markings, from marking junctures of the respectively successive intersection point to the preceding intersection point is effected over the involved pathfinder conductors in the same manner as in the previously described pathfinder system. In FIG. 4, it is effected at the marking juncture *f*E1 by way of the coincidence circuit U*e*1 and in the pathfinder conductor which is at such place connected, it is effected by way of the seizure contact *bde*1*n* and the decoupling diode G*de*1*n*. However, in connection with the pathfinder conductors, there are provided in addition to the already mentioned decoupling diodes which serve as first decoupling diodes, second decoupling diodes which are polarized so that a marking placed on a path portion of one intersection point, is transmissible to the marking juncture of the respectively following intersection point. Among these decoupling diodes is the decoupling diode R*de*1*n*.

The positive marking potential extended in a given case from the marking juncture FD*n* can be transmitted to the marking juncture *f*E1. It may be mentioned here that the second decoupling diodes which belong to the path finding conductors incoming at the marking juncture *f*E1, form jointly an Or-circuit. This Or-circuit can be substituted by an Or-circuit of different construction.

The juncture point *f*D*n* and the coupling multiple selector KVD shown in FIG. 4, belong to the first intersection point. These devices correspond to similarly referenced devices illustrated in FIG. 3, the difference residing merely in that the coupling multiple selector KVD of FIG. 4 delivers positive instead of negative marking potential. The marking juncture *f*E1 of FIG. 4 is likewise very similar to the marking juncture *f*E1 shown in FIG. 3. Both have a coincidence circuit U*e*1 serving as a first gate circuit, and also a second gate circuit which serves in connection with the marking juncture shown in FIG. 4, to signal to the coupling multiple selector KVE, after cessation of transmissibility of the first gate circuit, the simultaneous appearance of marking potentials coming from respectively adjacently disposed intersection points, thereby prompting the coupling multiple selector KVE to select a coupling multiple. The second gate circuit is again a blocking circuit and indicated by SU*e*1. However, it has two pass-inputs and one blocking input, the latter being emphasized by a prominent dot. A signal is delivered at its output only responsive to extension of the positive marking potential simultaneously to both pass-inputs but not to the blocking input. The incoming marking potentials are extended to the pass-inputs. One pass-input is therefore connected to pathfinder conductors incoming from the outer side of the coupling field, while the other pass-input is connected with the decoupling diode R*de*1*n* as well as with the further decoupling diodes over which marking potential is in given cases extended from the coupling stage D. To the blocking input is in a given case conducted the potential which makes the coincidence circuit U*e*1 conductive. This potential is here delivered from the output *x* of the coupling multiple selector KVD. The blocking input is connected with the corresponding input of the coincidence circuit U*e*1. Accordingly, so long as the coincidence circuit U*e*1 is conductive, the blocking circuit SU*e*1 will be blocked.

The manner in which the pathfinding is effected in the circuit example shown in FIG. 4, will now be briefly explained. Positive marking potential connected to the involved input and output, respectively, will be extended to points including the inputs of the coincidence circuit U*dn* at the first intersection point. The coupling multiple selector KVD effects a selection operation, thereby selecting, for example, the marking juncture *f*D*n* and terminating the delivery of the positive potential which was previously supplied at its output *x*. The transmission of the marking potential by way of the coincidence circuit U*e*1 is thereby interrupted. The marking potential already connected from the coupling multiple selector KVD, to the marking juncture *f*D*n*, is now extended by way of the decoupling diode R*de*1*n*, among other points, to one pass-input of the blocking circuit SU*e*1. At its other pass-input appears in a given case the marking potential connected at an output of the coupling field. This blocking circuit thereupon transmits a signal to the coupling multiple selector KVE, signifying that the coupling multiple E1 is suitable as a path portion for the sought-for connection path. Based upon this signal and in given cases upon further signals from suitable coupling multiples, the coupling multiple selector KVE effects a selection operation, thereupon marking the respectively involved marking juncture and at the same time terminating the delivery of the positive potential to the adjacent coupling stage F. The path finding operations are accordingly effected at the coupling stages D and E quite similar as in the circuit example shown in FIG. 3. The path finding in connection with the remaining coupling stages and intersecting points is effected as in the arrangement according to FIG. 3.

In the circuit example shown in FIG. 4, the blocking input of the blocking circuit belonging to the illustrated marking juncture, is connected with one input of the respectively associated coincidence circuit. However, the blocking input may instead be connected with the output of the associated coincidence circuit. It must be considered in this connection that, if the marking potential from the output side of the coupling field arrives, for example, at one input of the blocking circuit SU*e*1, it will likewise be transmitted by way of the coincidence circuit U*e*1, so long as the latter is conductive, such marking potential reaching from the output of U*e*1 the blocking input of the blocking circuit SU$e$1, whereby the latter is blocked as intended. Such blocking circuits, which belong to marking junctures at which no marking potential is received from the outer side of the coupling field and at which no marking potential is therefore received at the input which is being considered, need not be blocked, since no signal can as a matter of course be delivered thereby, at the involved coupling multiple selector, concerning the availability of the respective coupling multiple. The fact that the marking potential is in this case not transmitted by the associated coincidence circuit, for delivery at the blocking input of the involved blocking circuit, is accordingly immaterial and does not entail any disadvantage.

The above described manner of effecting a connection for the blocking input of the blocking circuits is utilized in the circuit arrangement shown in FIG. 5 for the marking junctures of the further intersection points. The path finding is in this example of the circuit arrangement effected exactly as in connection with the example shown in FIG. 4. However, FIG. 5 shows more in detail an example as to the manner in which the functions of the first and second gate circuits can be particularly advantageously effected at the marking junctures of the further intersection points, employing for this purpose merely diodes and negators. In the marking juncture shown in FIG. 5, there is connected a first negator Q1 to the terminal thereof which faces toward the output side of the coupling field. To the output of this negator Q1 are connected the second and third negators Q2 and Q3 by way of the diodes R1 and R3 which diodes are conductive for the marking potential. The marking potential which is to be transmitted in a given case, in a direction toward the center of the coupling field, is extended by way of the output of the second negator Q2, to the input of which is also connected, over the decoupling diode R2, the potential for effecting the transmissibility and the output of which is connected with the input of the third negator Q3 by way of the diode R5 which is conductive for the marking potential. The marking potential which may in a given case arrive from the preceding intersection point is conducted to the input of a fourth negator Q4 the output of which is likewise connected by way of the diode R4, which is conductive for the marking potential, with the input of the third negator Q3 the output of which is connected with the associated coupling multiple selector KVE.

There will now be explained the function of the circuit or switching elements of the marking juncture shown in FIG. 5. A negator operates thereby in such a manner that it delivers at its output positive potential so long as no positive potential is extended to its input. In the latter case it will deliver a negative potential.

There shall be first considered the transmission of positive marking potential and the blocking of signals to the coupling multiple selector KVE. The positive marking potential is extended from the terminal indicated by the multiple symbol $p$ to the input of the first negator Q1 which accordingly delivers at its output negative potential which is blocked by the diodes R1 and R3. From the coupling multiple selector of the preceding intersection point is in the normal condition delivered negative potential which is to enable the transmission of the marking potential and to serve at the same time for the blocking of the second gate circuit. Such negative potential arrives at the diode R2 by way of the terminal indicated by the multiple symbol O and is blocked by this diode. Since no positive potential is extended to the negator Q2, such negator will deliver positive marking potential. This positive potential is extended as a transmitted marking potential to the path finding conductors connected at the terminal indicated by the multiple symbol $n'$. It is also extended over the diode R5 to the negator Q3 which thereupon delivers negative potential to the input of the coupling multiple selector KVE. This potential is not effective as a signal indicating an available coupling multiple since a positive potential is required for this purpose. In case no positive potential is received at the terminal indicated by the multiple symbol $p$, that is, when the coupling multiple belonging to the marking juncture which is here being considered is unsuitable for the desired connection path, the negator Q1 will deliver over the diode R3 a positive potential to the negator Q3 so that a signalling of the respective coupling multiple to the coupling multiple selector KVE is again omitted. The potential delivered by the negator Q1 is over the diode R1 extended to the negator Q2, the latter accordingly extending negative potential instead of the marking potential. A further extension of the marking potential is accordingly not effected.

There shall next be considered the manner in which the selection of a marking juncture at a preceding intersection point affects the restriction of the marking connected therewith. For the purpose of this restriction, there is connected positive potential to the line extending to the multiple symbol O, such positive potential reaching the negator Q2 by way of the diode R2. The negator Q2 therefore delivers negative potential, not the marking potential. The negative potential is blocked at the diodes G$de$1$n$ and R5, etc. The marking potential placed at the marked marking juncture of the preceding intersection point can be extended over the diode R$de$1$n$ to the negator Q4. The latter thereupon delivers negative potential which is blocked by diode R4. The same happens responsive to extension of marking potential to the negator Q4 over another diode connected at the multiple symbol $n''$. In the event that marking potential is now also extended to the terminal indicated by the multiple symbol $p$, the negator Q1 will also deliver negative potential which is blocked by the diodes R1 and R3. Accordingly, the negator Q3 does not receive positive potential by way of any one of the three diodes R3, R4 and R5, so that it delivers in such a case positive potential at the coupling multiple selector KVE as a signal indicating the availability of the respectively associated coupling multiple. This happens only when the positive marking potential is received at the respective marking juncture from both sides thereof and when the limitation of the marking has taken place at the adjacent intersection point, thus preventing extension of the negative potential, serving for the blocking, from the preceding intersection point. It will be seen, therefore, that the circuit and switching elements which are provided at the marking juncture shown in FIG. 5, carry out all the required functions. Moreover, the functions which belong to a coincidence circuit such as is provided at the marking juncture $f$D$n$, can likewise be effected with the aid of the circuit shown in FIG. 5, by omitting the circuit elements Q2, R1, R2 and R5. The circuit may therefore be used as a unit or standard component for the pathfinder network.

A transistor amplifier operating in emitter circuit may be used, for example, as a negator. The amplification effect of the transistor may be advantageously utilized for the equalization or compensation of voltage drops in the pathfinder network.

As already explained, the pathfinder system according to the invention, including the variants thereof, can be employed in connection with coupling or linking fields designed according to a desired grouping plan. The intermediate conductors or trunk lines extending between the coupling stages may also be provided with branchings. The situation shall be explained with reference to FIGS. 6 and 7.

FIG. 6 shows part of a coupling field which comprises two coupling stages D and E with all trunk lines extending therebetween. A plurality of trunk lines are provided with branching conductors which connect one input or output of one coupling multiple with a plurality of inputs or outputs of another coupling multiple. For example, the output 2 of the coupling multiple E2 is connected with the input 2 of the coupling multiple D2 and also with the input 1 of the coupling multiple D4. The trunk line used therefor has the two branches D2–E2 and D4–E2. The decoupling diodes are in the case of such branching trunk lines inserted so that the decoupling action thereof is not affected by the branching. The respective decoupling diodes are for this purpose inserted in each trunk branch. This is indicated in FIG. 7.

Referring now to FIG. 7, there are shown among others, the trunk line conductors which belong to the branches D1–E1 and D3–E1 of FIG. 6, such conductors being indicated at *f*. The decoupling diode G*d*1*e*1 is inserted in the trunk line conductor belonging to one branch and the decoupling diode G*d*3*e*1 is inserted in the trunk line conductor belonging to the other branch. If there were inserted a single decoupling diode only in one common section in which is disposed the seizure contact *bd*1*de*1, the positive marking potential incoming, for example, over the decoupling diode G*d*1*e*2, at the marking juncture *f*D1, could be extended to the pathfinder conductor belonging to the branch D1–E1 and from there to the marking juncture by way of the pathfinder conductor belonging to the branch D3–E1, which extends to the coupling multiple D3. This would happen even in a case in which a marking potential is neither extended over the marking juncture *f*E1 nor over marking junctures belonging to the coupling multiples E3 and E4, in which case the coupling multiple D3 is not at all accessible from the marked output of the coupling field, since the coupling multiple D3 is not connected with the coupling multiples E1, E3 and E4. Such an erroneous marking is avoided by the insertion of decoupling diodes in all branches of the trunk lines.

As already explained, it is necessary to insert in some situations in addition to the first decoupling diodes over which the original marking potential is to be transmitted, second decoupling diodes over which markings connected at path portions are to be transmitted to the respectively successive intersection point. These decoupling diodes are likewise to be inserted in each branch of the trunk lines. This is also indicated in FIG. 7. Thus, cooperatively associated with the first decoupling diode G*d*1*e*1 is the second decoupling diode R*d*1*e*1; cooperatively associated with the first decoupling diode G*d*3*e*1 is the second decoupling diode R*d*2*e*1, etc.

It may be mentioned here that an increase of the seizure contacts is unnecessary in the case of branching trunk lines. It will suffice to insert one seizure contact in a common portion of the branches. Thus, for example, there is shown in FIG. 7 the common seizure contact *bd*1*d*3*e*1 for both of the above considered branches. It must be considered in this connection that seizure of one branch of a trunk line suffices to render the other branch likewise busy.

In the part of a coupling field shown in FIG. 6, comprising the coupling stages D and E, the trunk lines branch off at the coupling stage E, that is, from the right to the left. However, trunk lines may be provided which branch off at the coupling stage D, that is, from the left to the right. Decoupling diodes are in such case likewise to be inserted in each branch. This is also required in a case in which trunk lines branch off at the coupling stage D as well as in the coupling stage E.

A change in the grouping is sometimes required, that is, trunk lines extending between coupling stages have to be differently circuited. This is necessary, for instance, when traffic conditions demand routing of calls so as to load certain outputs of the coupling field more strongly than others. Such changes also include changes with respect to trunk lines which branch off from the right to the left so as to produce branchings extending from the left to the right. A particular measure is advantageously applied in order to effect such changes quickly and efficiently.

Such measure contemplates the insertion, in parts of the coupling field in which changes of this kind are to be expected, of decoupling diodes in the branching trunk lines in each branch as well as in a common section thereof. An example of such an arrangement is illustrated in FIG. 8.

Referring now to FIG. 8, decoupling diodes are inserted in both branching pathfinder conductors *f*, including the decoupling diode G*d*1*e*1 and decoupling G*d*1*d*3*e*1 in the common section. Moreover, second decoupling diodes are provided including the decoupling diodes R*d*1*e*1 and R*d*1*d*3*e*1. A change in the circuitry merely entails relocating the involved pathfinder conductors by soldering operations without necessitating insertion of additional decoupling diodes.

It is in such cases advantageous to insert from the outset seizure contacts in the respective branches and also in the common section, thus avoiding the provision of additional seizure contacts and respectively associated seizure relays incident to making the desired changes. Accordingly, in the circuit example shown in FIG. 8, there are inserted seizure contacts in the two branches of the branching pathfinder conductors *f* as well as in the common section, including the seizure contacts *bd*1*e*1 and *bd*1*d*31. As shown in FIG. 9, the corresponding seizure relays B*d*1*e*1 and B*d*1*d*3*e*1 are connected with the applicable conductors *c* in the network of seizure conductors.

Attention may be called to the fact that the above described and illustrated measure, namely, of providing decoupling diodes for each branch of intermediate conductors or trunk lines, can be advantageously applied in connection with other pathfinder systems, insofar as a complete decoupling can be obtained which would be otherwise impossible. Decoupling diodes may in such systems also be inserted in the common sections of branching trunk lines. Seizure contacts are in such case advantageously provided as required.

Changes may be made within the scope and spirit of the appended claims which define what is believed to be new and desired to have protected by Letters Patent.

I claim:

1. In a circuit arrangement for a coupling field selection system, comprising a coupling field having a plurality of coupling stages and including a pathfiinder network having conductors which are respectively assigned to trunk lines of the coupling field and interconnected at marking junctures assigned respectively to coupling multiples, means for simultaneously marking the input and output belonging to a desired connection, whereupon a path portion which is marked from the input and output is selected at an intersecting point extending transverse through the pathfinder network and thereupon newly marked by restriction of the marking previously present at the corresponding intersection point, said new marking being in opposition to the original marking in the pathfinder network, and transmitted to further intersection points at which further suitable path portions are respectively selected with the aid of the markings merging thereat, and wherein the corresponding operations are repeated until a path is determined in the pathfinder network, by the selected path portions, over which a desired connection is to be extended; the combination of means, operative upon selection of a path portion at a first intersection point, for the restriction of the markings, at the intersection points lying directly adjacent the first intersection point, to interrupt the extension of the original markings to the first intersection point, means for effecting extension of the marking placed on the path portion selected at the first intersection point to the two adjacent intersection points over conductors of the pathfinder network provided for the transmission of the original markings, without being hindered by the original markings, means for thereupon selecting at said adjacent intersection points further path portions in accordance with the prevailing markings, means for likewise interrupting at the further intersection points located beyond and adjacent said intersection point which are directly adjacent to the first intersection point, the original markings for the further restriction of the markings, so as to transmit thereto unhindered the markings placed on the path portions selected at the intersection points which are directly adjacent the first intersection point, and means for thereupon selecting path portions at said further intersection points, and repeating said operations with respect to still further intersection points so as to determine a desired connection path extending over the coupling field.

2. A circuit arrangement according to claim 1, wherein the first mentioned means for simultaneously marking an input and an output for said coupling field comprises means for marking said input and output by a first marking potential of one polarity, means for marking the path portions by a second marking potential of a second polarity, decoupling diodes disposed in the pathfinder conductors which diodes are polarized so as to effect unhindered transmission of markings, seizure contact means also included in said pathfinder conductors which contact means are closed in the presence of idle condition of the respective trunk lines while being open when said trunk lines are occupied, coincidence circuit means at the first intersection point, inserted in the respective marking juncture thereof, for signalling the marking condition of the marking junctures to a central coupling multiple selector serving for the selection of a coupling multiple and for the marking of the marking juncture respectively associated therewith, such marking being effective by the connection of the second marking potential, first gate means for transmitting at given marking junctures of the further intersection points the original marking potential, means for cancelling the transmissibility of said first gate means, and second gate means provided at said marking junctures for the evaluation of the first and second marking potential, said second gate means signaling the simultaneous appearance of both marking potentials to the coupling multiple selectors assigned respectively to the corresponding intersection points, so as to cause the respective selectors to select a coupling multiple.

3. A circuit arrangement according to claim 2, comprising coincidence circuits serving as first gate circuits, and blocking circuits serving as second gate circuits, said blocking circuits delivering a signal at their respective outputs only in the event that the first marking potential is extended to one input thereof while the second marking potential is extended to the second input thereof.

4. A circuit arrangement according to claim 1, wherein the first mentioned means for simultaneously marking an input and an output for said coupling field comprises means for marking said input and output as well as said path portions by placing thereon the identical marking potential, first decoupling diodes disposed in the pathfinder conductors which diodes are polarized so as to effect unhindered transmission of the original marking from the respectively preceding intersection point to the succeeding intersection point, second decoupling diodes likewise disposed in the respective pathfinder conductors which second diodes are polarized so that the marking placed on path portions is transmissible thereover to the marking junctures of the respectively following intersection point, seizure contact means inserted in the pathfinder conductors which seizure contact means are closed in the presence of idle condition of the respective trunk line while being open in the presence of the occupied condition thereof, coincidence circuit means inserted in the marking juncture at the first intersection point operative to signal the marking condition of the marking juncture to a central coupling multiple selector which is operative to effect the selection of a coupling multiple and for the marking of the marking juncture respectively associated therewith, first gate circuits for transmitting at the marking junctures of further intersection points the original marking potential, the transmissibility of said first gate circuits being cancelled, and second gate circuits at the respective marking junctures, for evaluating the marking potential extended thereto, said second gate circuits being after cancellation of the transmissibility of the first gate circuits operative to signal the simultaneous appearance of marking potential from adjacent intersection points to the coupling multiple selectors of the respective intersection points so as to cause the respective selectors to effect selection of coupling multiples.

5. A circuit arrangement according to claim 4, comprising coincidence circuits serving as first gate circuits and blocking circuits serving as second gate circuits, said second gate circuits provided respectively with two pass-inputs and one blocking input, means for conducting the incoming marking potentials to said pass-inputs while conducting to the blocking input in given cases a potential which is effective to make the coincidence circuit conductive while blocking the blocking circuit.

6. A circuit arrangement according to claim 5, comprising means for connecting the respective blocking input of a blocking circuit with the input of the coincidence circuit which belongs to the corresponding marking juncture and over which the transmissibility thereof is affected.

7. A circuit arrangement according to claim 5, wherein the respective blocking input of a blocking circuit is connected with the output of the coincidence circuit belonging to the corresponding marking juncture.

8. A circuit arrangement according to claim 4, wherein the functions of the first and the second gate circuits are at a respective marking juncture effected with the aid of diodes and negators, the input of a first negator being connected at a terminal of the respective marking juncture which terminal faces in the direction of the outside of the coupling field, a second and a third negator connected to the output of the first negator by way of diodes which are conductive for the marking potential, the marking potential which is in a given case to be extended in a direction toward the center of the coupling field being extended by way of the output of the second negator to the input of which is by way of a decoupling diode conducted the potential for affecting the transmissibility and the output of which is by way of a further diode which is conductive for the marking potential, connected with the input of the third negator, the marking potential extended in a given case from a preceding intersection point being conducted to the input of a fourth negator the output of which is likewise connected by way of a diode which is conductive for the marking potential, with the input of the third negator the output of which is connected with the respectively associated coupling multiple selector.

9. A circuit arrangement according to claim 8, comprising transistor amplifiers, operating in emitter circuit, constituting negators, the respective amplifiers delivering at the output thereof a positive potential so long as no positive potential is extended to the input thereof while otherwise delivering a negative potential.

10. A circuit arrangement according to claim 9, wherein the transmissibility of a first gate circuit is cancelled respectively by the operation of the coupling multiple selector of the preceding intersection point incident to the selection of a coupling multiple.

11. A circuit arrangement according to claim 10, for use in connection with a coupling field having branching trunk lines extending between coupling stages, wherein the respective decoupling diodes are inserted in each branch.

12. A circuit arrangement according to claim 10, for use in connection with a coupling field having branching trunk lines extending between coupling stages, wherein the respective decoupling diodes are inserted in each branch and also in a common section thereof.

13. A circuit arrangement according to claim 12, wherein seizure contacts are inserted in each branch and also in a common section thereof, said seizure contacts being respectively controlled by seizure relays which are inserted at corresponding points of the network of the seizure conductors.

14. A circuit arrangement according to claim 13, wherein all concerned inputs and outputs of the coupling field are for the consideration of a plurality of inputs and/or outputs in the determination of a connection path, simultaneously marked by marking potential, and that upon determination of a connection path between a coupling multiple to which are connected inputs and a coupling multiple to which are connected outputs, having respectively at least one idle input and output, there is effected a selection operation at the coupling multiples thus determined, so as to ascertain respectively a single idle input and output for the extension of the desired connection paths.

15. A circuit arrangement according to claim 14, comprising switching means for effecting the actuation of coupling point contacts which are disposed in a network of setting conductors superposed on the coupling field, for the purpose of setting a connection path determined by the path finding operations.

16. A circuit arrangement according to claim 15, comprising switching means disposed in a network of seizure conductors superposed on the coupling field, for holding actuated coupling point contacts.

References Cited

UNITED STATES PATENTS

| | | | |
|---|---|---|---|
| 3,055,982 | 9/1962 | Kowalik | 179—18.7 |
| 3,226,486 | 12/1965 | Benmussa et al. | 179—18.7 |

KATHLEEN H. CLAFFY, *Primary Examiner.*

L. A. WRIGHT, *Assistant Examiner.*